United States Patent [19]

Werner et al.

[11] 3,746,046

[45] July 17, 1973

[54] DRY TORQUE MOTOR SERVO VALVE

[75] Inventors: Joseph J. Werner, Minneapolis; Elias J. Amdur, St. Louis Park, both of Minn.

[73] Assignee: Honeywell Inc., Minneapolis, Minn.

[22] Filed: Dec. 20, 1971

[21] Appl. No.: 209,899

[52] U.S. Cl. ............................ 137/625.61, 335/229
[51] Int. Cl. ............................................. F16k 11/00
[58] Field of Search............ 137/625.25, 85, 625.61, 137/625.62; 251/129, 130; 335/229, 230; 310/80, 82

[56] References Cited
UNITED STATES PATENTS

| | | | |
|---|---|---|---|
| 1,646,234 | 10/1927 | Creed | 335/230 |
| 2,435,425 | 2/1948 | Cunningham | 335/229 |
| 2,439,499 | 4/1948 | Williams et al. | 310/82 UX |
| 2,924,241 | 2/1960 | Bauer | 137/625.62 X |
| 3,095,906 | 7/1963 | Kolm, Jr. | 137/625.62 |
| 3,199,927 | 8/1965 | Bidlack et al. | 137/625.61 X |
| 3,415,163 | 10/1968 | Seivemon Inaba et al. | 137/625.61 X |
| 3,458,769 | 7/1969 | Stampeli | 251/30 X |
| 3,517,360 | 6/1970 | Gray | 335/230 |

*Primary Examiner*—Henry T. Klinksiek
*Attorney*— Lamont B. Koontz and Trevor B. Joike

[57] ABSTRACT

A servo valve is disclosed having a dry electrical torque motor operating an armature which controls a flapper valve, an o-ring for sealing the dry torque motor from the flapper valve, a boost valve responsive to the output from the flapper valve, and a feedback spring responsive to the movement of the boost valve for repositioning the armature controlling the flapper valve. Moreover, the electrical torque motor includes a pair of low reluctant bars joining the like poles to increase the electromotive force exerted upon the armature.

7 Claims, 4 Drawing Figures

Patented July 17, 1973　　3,746,046

Patented July 17, 1973   3,746,046

DRY TORQUE MOTOR SERVO VALVE

This invention relates to improvements in electrically operated fluid handling servo valves.

When using a torque motor to control a hydraulic valve, it is desirable to provide a dry chamber for the torque motor. Some of the advantages in using a dry torque motor include easy accessability to the torque motor and less resistance to armature movement. Because a dry torque motor is used, some means must thereby be provided to seal the dry torque motor from the fluid handling valve.

The prior art, as shown in U.S. Pats. Nos. 2,294,241 and 3,095,906, have relied on either a flexture tube or a diaphragm to seal the dry torque motor from the hydraulic servo valve. However, these two types of sealing means are undesirable since they are expensive and do not lend themselves to the torque motor of the instant invention.

These prior art disadvantages have been overcome by placing an o-ring in the device to seal the torque motor from the valve. The o-ring is placed in the plane which is normal to the armature at its pivot point and, in such a position, the o-ring results in negligible hysteresis. Since the o-ring does not suffer any flexture, no hysteresis results and the o-ring does not interfere with the operation of the torque motor.

Another improvement made over the prior art relates to the torque motor itself. One prior art torque motor places a U-shaped north pole magnetic structure on one side of the armature and a U-shaped south pole magnetic structure on the other side of the armature. The armature in this arrangement pivots about a point which is between the two poles. If the pivot is outside of the pole structure, this arrangement results in the magnetic forces exerted on the armature opposing each other and requires more current to move the armature a given distance.

The prior art, as shown in the U.S. Pat. No. 3,095,906 overcame this disadvantage by positioning an armature between two magnets such that the top portion of the armature lies in a gap which is formed by the north pole of one magnet and the south pole of the other. The lower portion of the armature is positioned in a gap formed by the south pole of the first magnet and the north pole of the second magnet. Thus, the forces exerted on the armature by the magnetic structure will be additive rather than subtractive and result in greater efficiency. Also, this arrangement allows for the pivot point to be closer to the middle of the armature thus balancing that armature.

In this prior art arrangement, however, it is noted that the flux must travel through the permanent magnets. Permanent magnets are a high reluctance material and, therefore, impede the flow of flux trough the magnetic structure. Applicant has found that by connecting the north poles together and by connecting the south poles together with bars of a low reluctant material, the flux flow will be increased resulting in an increase in the electromotive force exerted on the armature.

Other objects and advantages will be apparent from the following detailed description and accompanying drawing in which.

Figures 1, 3:
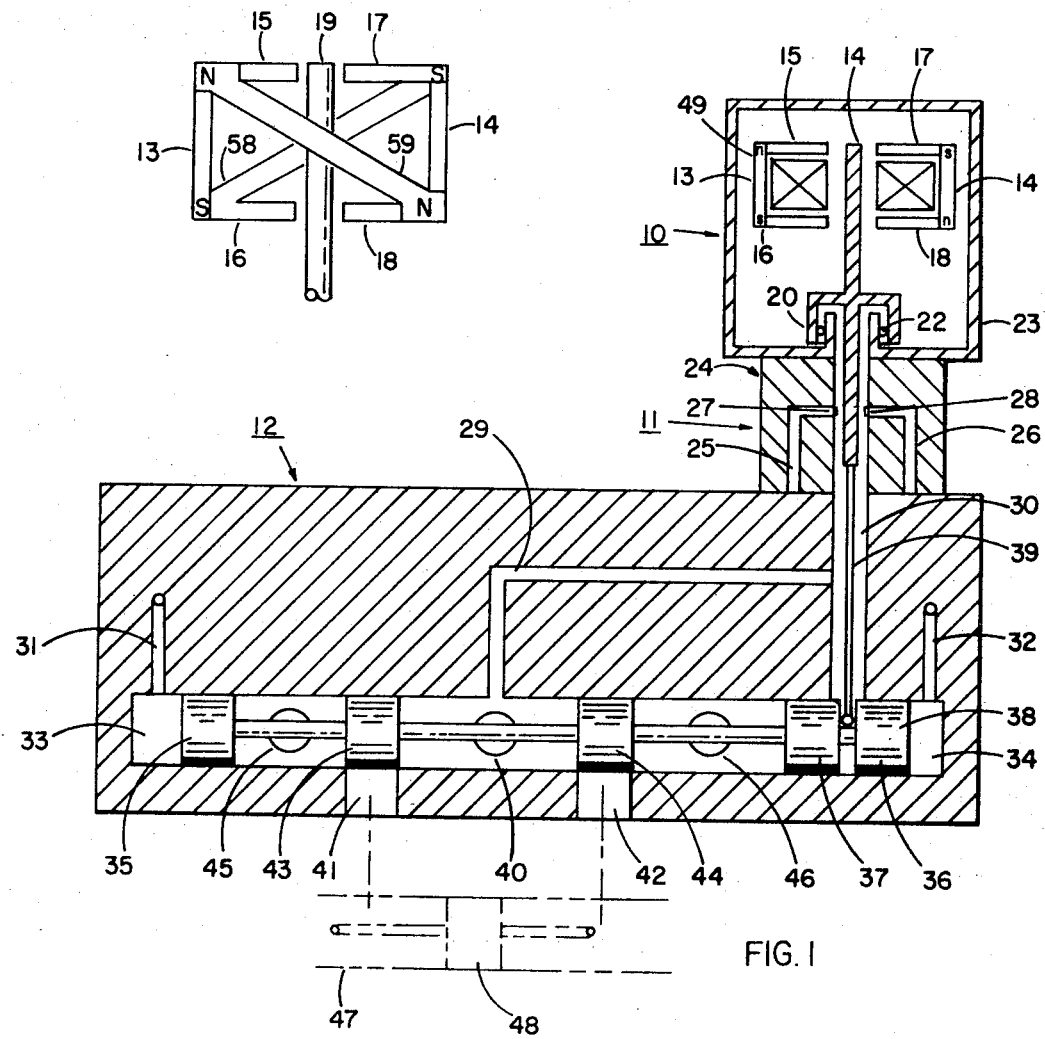
FIG. 1 is a vertical sectional view through the electro-hydraulic servo valve of this invention.
FIG. 3 is a view showing the magnetic structure of the electrical torque motor.

In FIG. 1, reference numeral 10 denotes the electrical torque motor which is positioned above the flapper valve 11 which in turn operates the boost valve 12.

In particular, the electrical torque motor comprises a pair of permanent magnets 13 and 14. Permanent magnet 13 is magnetically associated with a pair of pole pieces 15 and 16 whereas permanent magnet 14 is magnetically associated with pole pieces 17 and 18. The permanent magnets are arranged such that pole pieces 15 and 18 are north poles and pole pieces 16 and 17 are south poles. Armature 19 is positioned in the gap formed between the pole pieces 15–18 and has a generally cup shaped projection 20 for cooperating with o-ring 22 and housing 23. The o-ring can take the shape of any other shape, i.e., a square ring, which is capable of providing a seal.

Figures 2, 4:
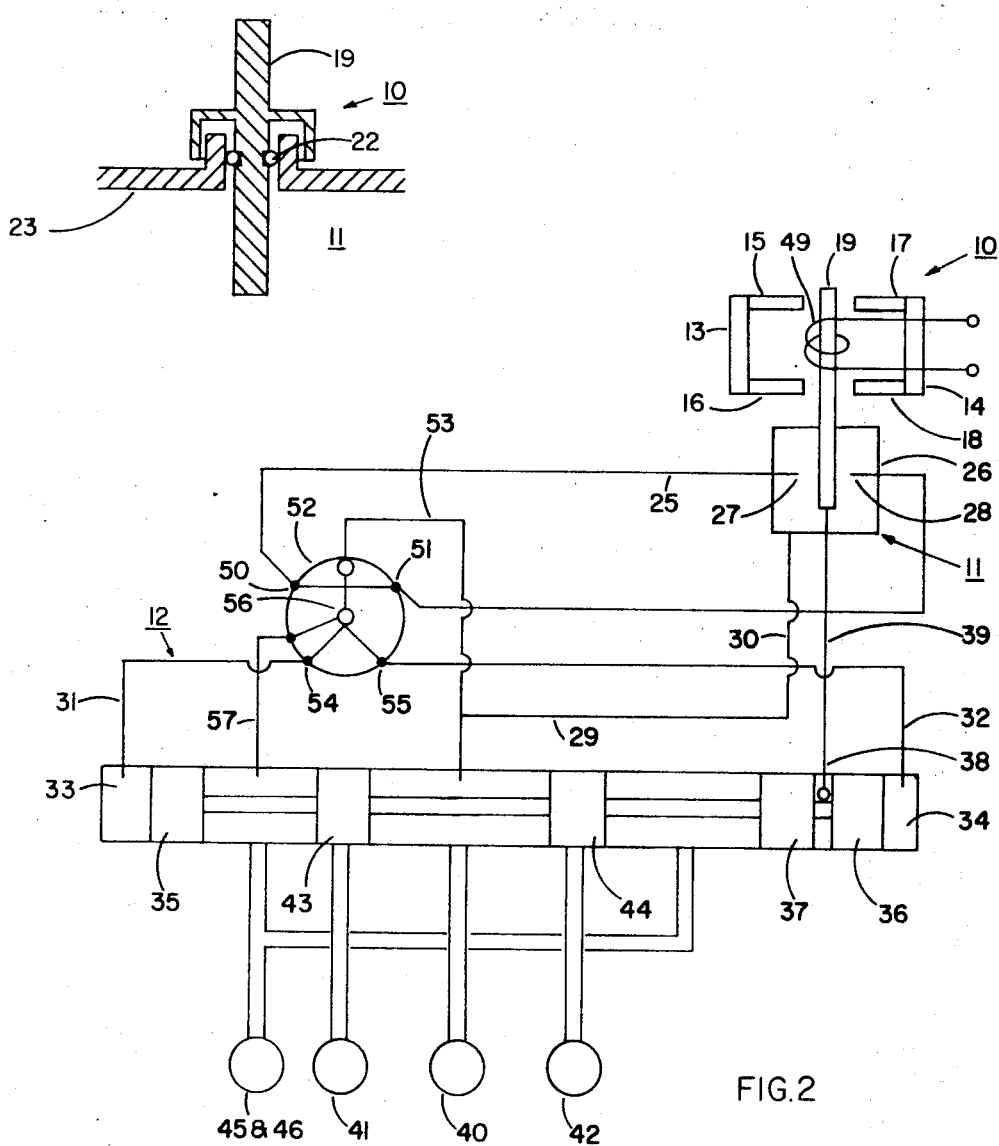
FIG. 2 is a hydraulic circuit schematic of the present invention.
FIG. 4 is a view showing an alternative placement of the sealing ring.

FIG. 4 shows an alternative method of sealing the torque motor from the hydraulic portions 11 and 12. In FIG. 4, an indent is formed in the armature 19 and a sealing ring 22' is placed in the indent and cooperates with housing 23 to form a seal.

The o-ring 22 seals the dry torque motor 10 from the hydraulic portion of the servo valve comprising flapper valve 11 and boost valve 12. The armature 19 extends down through the body 24 of the flapper valve 11. Positioned within the body portion 24 are channels 25 and 26 which terminate in nozzles 27 and 28 positioned opposite from each other and separated by the armature 19. Fluid is supplied to nozzles 27 and 28 from channel 29 through channel 30 such that whenever the armature is moved off of center, a differential pressure is established in nozzles 27 and 28 which pressures are transmitted to channels 25 and 26. A fluid amplifier is constructed into the bottom of body portion 24 and will be more fully described with respect to FIG. 2.

The channels 25 and 26 are connected to the control ports of this fluid amplifier which has its output ports connected to channels 31 and 32. Channels 31 and 32 cooperate with chambers 33 and 34, respectively, of the boost valve 12. Whenever a differential pressure exists in the chambers 33 and 34, spool 35 will move in such a direction as to reestablish equal pressures in chambers 33 and 34. Spool 35 has lobes or lands 36 and 37 spaced sufficiently apart to receive the end 38 of a feedback spring 39.

Supply port 40 supplies the hydraulic fluid to the boost valve 12 and will flow out of outlet ports 41 and 42 depending upon the position of the spool 35. The position of the spool 35 determines the extent that lands 43 and 44 cover outlet ports 41 and 42 respectively. Return ports 45 and 46 are positioned between lands 35 and 43, and 44 and 37 respectively to return the hydraulic fluid back to its reservoir.

The fluid from outlet ports 41 and 42 is fed to a cylinder 47 for positioning the output piston 48.

The operation of the circuit can be better understood from a review of FIG. 2 which has the same reference numerals as FIG. 1 when applicable. Fluid is supplied to the flapper valve 11 from supply port 40, through channel 29 and through channel 30. When an electrical signal is applied to the coil 49, armature 19 moves by a corresponding amount to establish a differential pressure in nozzles 27 and 28. This differential pressure is transmitted by channels 25 and 26 to input ports 50 and 51 of fluid amplifier 52. The power jet for the fluid amplifier is supplied from supply port 40 through fluid channel 53. The differential pressure established at ports 50 and 51 will cause deflection of the power jet and result in a differential fluid flow through outlet ports 54 and 55. The differential fluid flow output from the fluid amplifier results in a differential pressure in chambers 33 and 34 which causes movement of the spool 35. Movement of spool 35 results in the movement of lands 43 and 44 to establish a differential flow from the output ports 41 and 42.

Isolation chamber 56 of fluid amplifier 52 is connected by way of fluid channel 57 to the return ports 45 and 46.

As armature 19 is moved by the forces acting on it as a result of the energization of coil 49, projecting cup 20 ride over the o-ring 22 without causing flexure of the o-ring. The pivot point of the armature is located in the plane of the o-ring. Thus, the o-ring seals the dry torque from the hydraulic portion of the valve and is not subject to hysteresis, and the armature will always return to its neutral position upon deenergization of the coil 49 without any offset in its position.

When the spool valve 35 moves in response to a differential pressure in chamber 33 and 34, the feedback spring 39 will move by a corresponding amount to reposition the armature 19 to a position where the forces acting on the armature are balanced. Should the electrical signal to the coil 49 be changed, the forces will become unbalanced and the armature will again move.

Turning now to FIG. 3, there is disclosed the particular arrangement of the torque motor without the showing of the coil 49. The permanent magnet and pole piece arrangement is arranged such that pole pieces 15 and 18 are north poles and pole pieces 16 and 17 are south poles. As has been noted hereinbefore, the flux which will result from energization of coil 49 travels through the permanent magnet.

This flux flow can be greatly enhanced by providing an alternative low reluctance path to the flux rather than through the high reluctance path of the permanent magnets. Therefore, bar 58 of a low reluctance material is arranged such that it joins the south poles of permanent magnets 13 and 14 and bar 59 of a similar low reluctance material is arranged to join the north poles of permanent magnets 13 and 14.

Bars 58 and 59 allow the flux established by the coil 58 to pass through the circuit without going through the high reluctance paths of permanent magnets 13 and 14. Bars 58 and 59 allow a much smaller input signal to the coil 49 to move armature 19.

The embodiments of the invention in which an exclusive property or right is claimed are defined as follows:

1. An electro-hydraulic servo valve having an electrical torque motor for driving a hydraulic valve, said torque motor comprising first and second generally U-shaped magnetic means, each having a north pole and a south pole, wherein said poles of said first magnetic means are placed across a gap from the opposite polarity poles of said second magnetic means, first and second low reluctance material means, the first of said low reluctance material means for joining together the north poles of said first and second magnetic means, the second of said low reluctance material for joining together the south poles of said first and second magnetic means, and armature means positioned in said gap and having coil means for moving said armature upon energization of said coils means, said hydraulic valve means having armature movement responsive means for producing an output depending upon the movement of said armature means.

2. The electro-hydraulic servo valve of claim 1 wherein said armature movement responsive means comprises flapper valve means having a pair of nozzle means positioned with respect to said armature for establishing a differential pressure upon said armature moving.

3. The electro-hydraulic servo valve of claim 2 wherein said hydraulic valve means further comprises boost valve means having a spool which moves in response to the differential pressure established in said nozzle means.

4. The electro-hydraulic servo valve of claim 3 wherein said hydraulic valve means further comprises feedback means connected to said armature and responsive to the movement of said spool.

5. The electro-hydraulic servo valve of claim 4 wherein said torque motor is enclosed in a dry chamber and further comprising sealing means to seal said dry chamber from said armature movement responsive means.

6. The electro-hydraulic servo valve of claim 3 wherein said torque motor is positioned in a dry chamber and further comprising sealing means for sealing said dry chamber from said armature movement responsive means.

7. The electro-hydraulic servo valve of claim 6 wherein said hydraulic valve means further comprises feedback means connected to the said armature and responsive to movement of said spool.

* * * * *